(12) United States Patent
Shimizu

(10) Patent No.: US 10,451,724 B2
(45) Date of Patent: Oct. 22, 2019

(54) RADAR APPARATUS

(71) Applicant: DENSO CORPORATION, Kariya, Aichi-pref. (JP)

(72) Inventor: Koji Shimizu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 374 days.

(21) Appl. No.: 15/515,795

(22) PCT Filed: Oct. 2, 2015

(86) PCT No.: PCT/JP2015/078107
§ 371 (c)(1),
(2) Date: Mar. 30, 2017

(87) PCT Pub. No.: WO2016/052744
PCT Pub. Date: Apr. 7, 2016

(65) Prior Publication Data
US 2017/0307749 A1 Oct. 26, 2017

(30) Foreign Application Priority Data
Oct. 3, 2014 (JP) .................................. 2014-204993

(51) Int. Cl.
*G01S 13/60* (2006.01)
*G01S 13/58* (2006.01)
(Continued)

(52) U.S. Cl.
CPC .............. *G01S 13/60* (2013.01); *G01S 7/415* (2013.01); *G01S 13/34* (2013.01); *G01S 13/583* (2013.01);
(Continued)

(58) Field of Classification Search
CPC ............................ B60T 8/17558; G01S 13/345
See application file for complete search history.

(56) References Cited

U.S. PATENT DOCUMENTS 5,768,131 A * 6/1998 Lissel ...................... G01S 13/34
180/169
6,396,436 B1 * 5/2002 Lissel ...................... G01S 13/34
342/104
(Continued)

FOREIGN PATENT DOCUMENTS

EP 0677172 B1 * 10/1995 ........... G01S 13/931
JP 2002-228749 8/2002
(Continued)

*Primary Examiner* — Bernarr E Gregory
(74) *Attorney, Agent, or Firm* — Knobbe, Martens, Olson & Bear, LLP

(57) ABSTRACT

In a radar apparatus, a determining unit compares a ratio (−Vr/Vn) of a relative velocity (Vr) to a radar-apparatus-installed vehicle velocity (Vn) with a determination value (α) that is a cosine (cos θc) of the detection limit angle (±θc) or the cosine (cos θc) plus a correction value including a measurement error. When a determination is made that the ratio (−Vr/Vn) exceeds the determination value (α), a target is determined to be a real target of a crossing object, such as a crossing pedestrian, or a stationary object, whereas when a determination is made that the target is not a real target, the target is determined to be a ghost of a crossing object or a stationary object. Thus, a real target of a crossing object or a stationary object can be distinguished from a ghost of the object, and hence a ghost is not falsely determined to be a real target, preventing inappropriate brake control.

8 Claims, 14 Drawing Sheets

(51) Int. Cl.
  *G08G 1/16*  (2006.01)
  *G01S 13/72*  (2006.01)
  *G01S 7/41*  (2006.01)
  *G01S 13/93*  (2006.01)
  *G01S 13/34*  (2006.01)
  *G01S 13/00*  (2006.01)

(52) U.S. Cl.
  CPC .......... *G01S 13/584* (2013.01); *G01S 13/589* (2013.01); *G01S 13/723* (2013.01); *G01S 13/931* (2013.01); *G08G 1/163* (2013.01); *G08G 1/165* (2013.01); *G08G 1/166* (2013.01)

(56) References Cited

U.S. PATENT DOCUMENTS

| | | | | |
|---|---|---|---|---|
| 8,077,075 | B2* | 12/2011 | Randler | G01S 13/345 |
| | | | | 342/104 |
| 8,704,704 | B2* | 4/2014 | Luebbert | G01S 13/931 |
| | | | | 342/104 |
| 2004/0145513 | A1* | 7/2004 | Katayama | G01S 13/345 |
| | | | | 342/70 |
| 2010/0134344 | A1 | 6/2010 | Uesato | |
| 2012/0116665 | A1* | 5/2012 | Aoki | B60T 8/17558 |
| | | | | 701/301 |
| 2014/0145871 | A1* | 5/2014 | Asanuma | G01S 13/345 |
| | | | | 342/128 |

FOREIGN PATENT DOCUMENTS

| | | |
|---|---|---|
| JP | 2002-228749 A | 8/2002 |
| JP | 4082442 | 4/2008 |
| JP | 4082442 B2 | 4/2008 |
| JP | 2010-002389 | 1/2010 |
| WO | 2009/019881 A1 | 2/2009 |

* cited by examiner

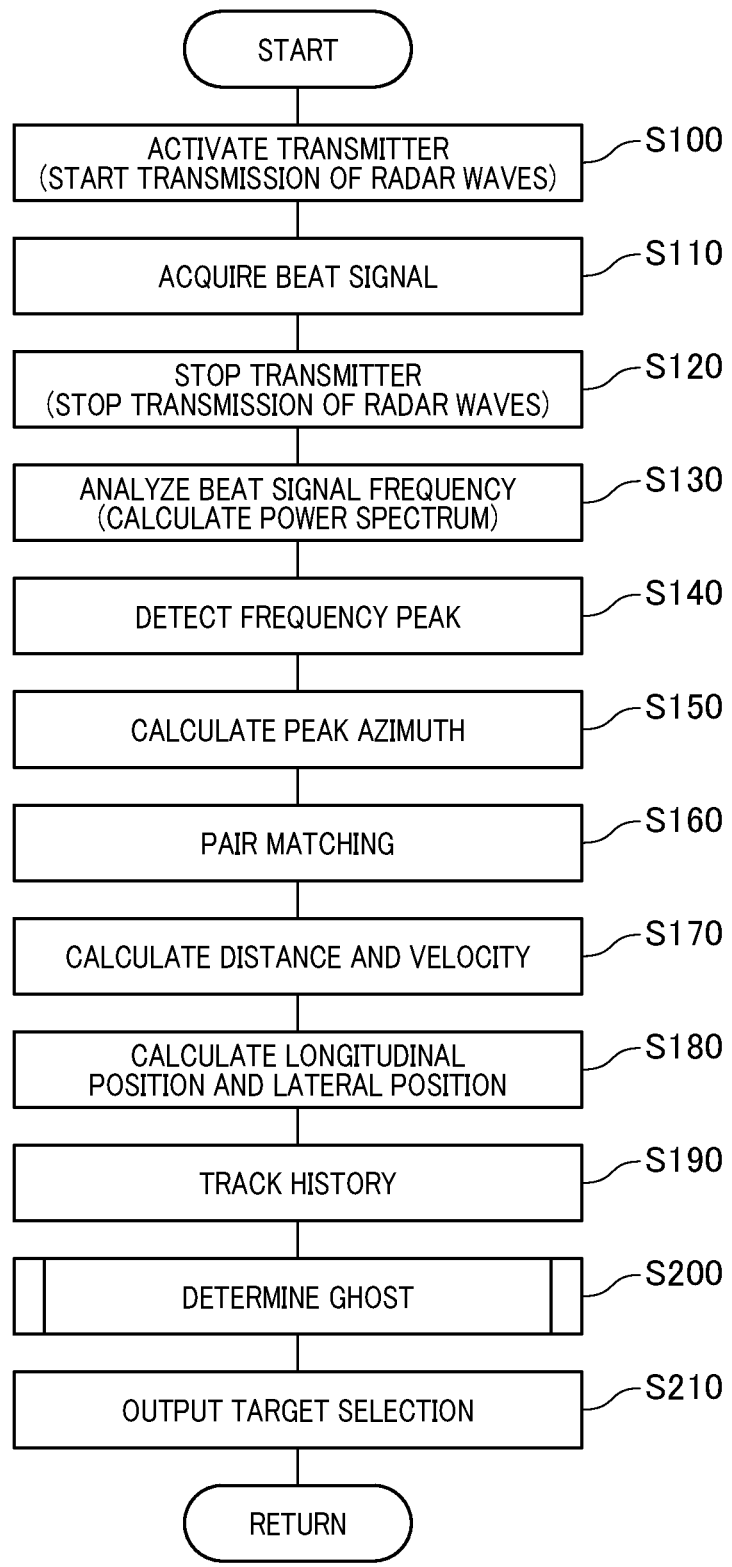

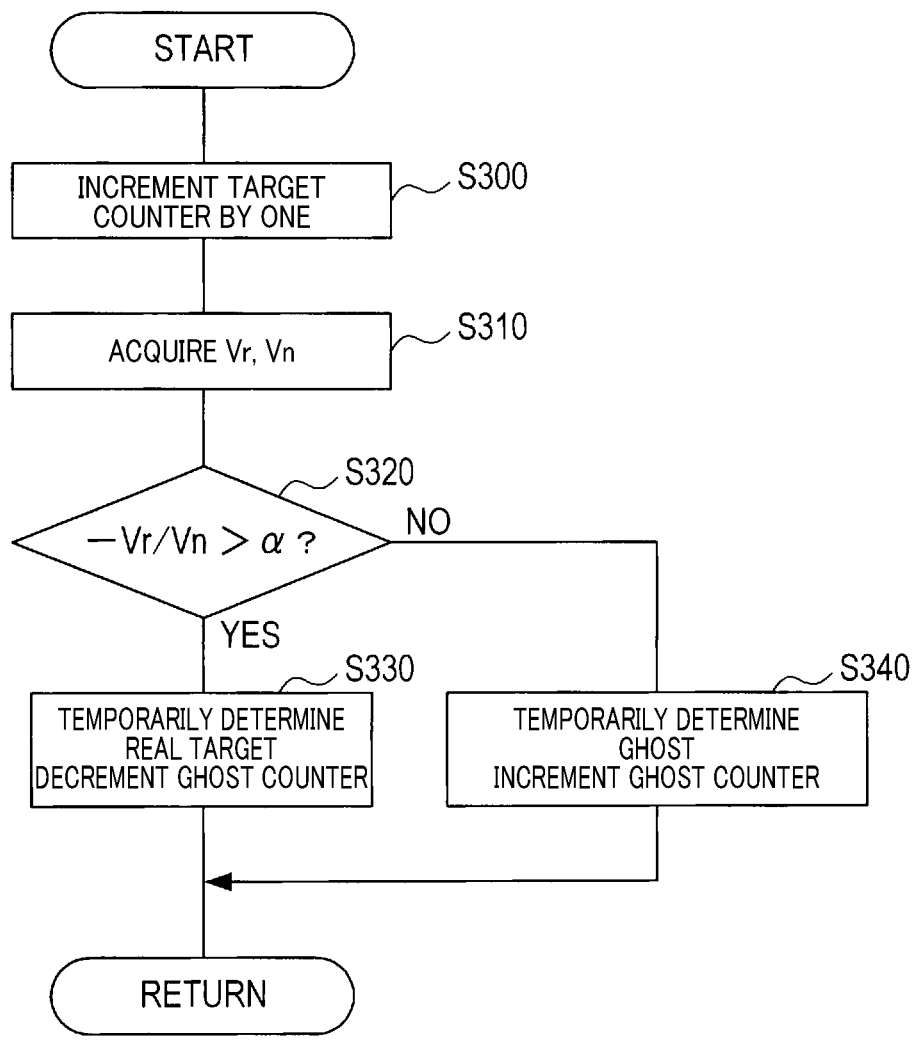

FIG.7
(a) IN THE CASE OF CROSSING PEDESTRIAN REAL TARGET
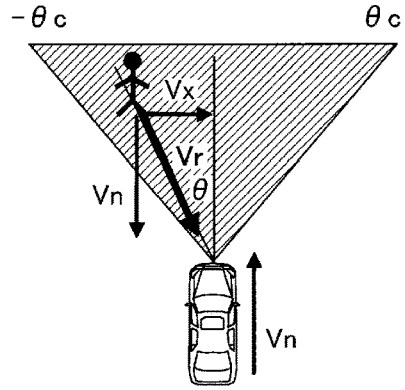
$Vr = Vx \cdot \sin\theta + Vn \cdot \cos\theta$
$-Vr/Vn > \cos\theta c$
(b) IN THE CASE OF STATIONARY OBJECT REAL TARGET
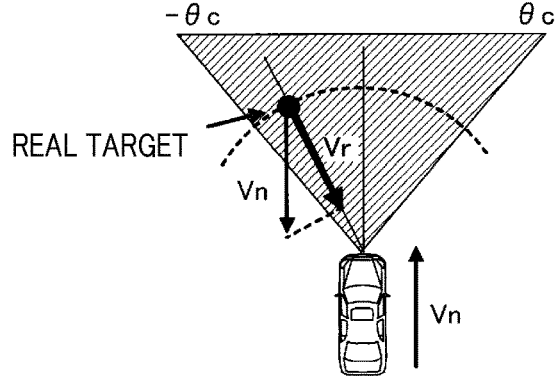
$Vr = Vn \cdot \cos\theta \; (-\theta c < \theta < \theta c)$
$-Vr/Vn > \cos\theta c$
(c) IN THE CASE OF STATIONARY OBJECT GHOST
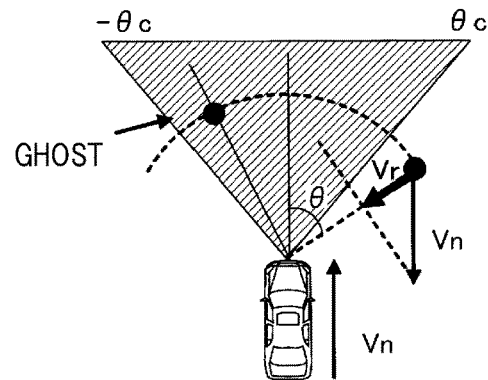
$Vr = Vn \cdot \cos\theta \; (|\theta| > |\theta c|)$
$-Vr/Vn < \cos\theta c$

FIG.13
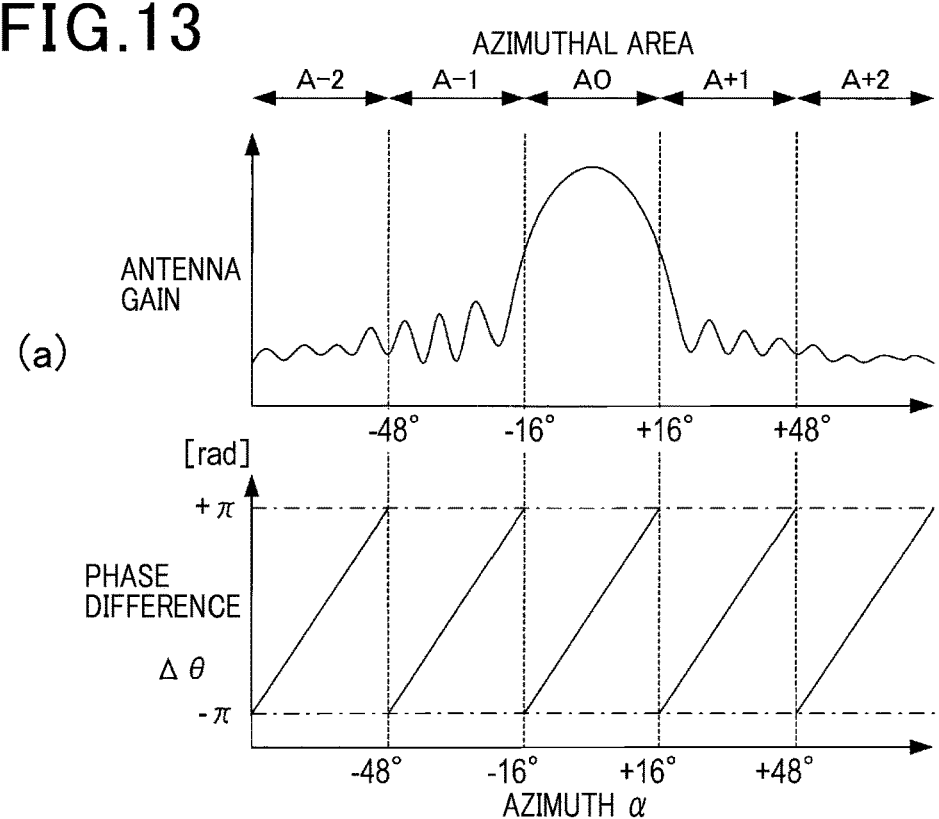
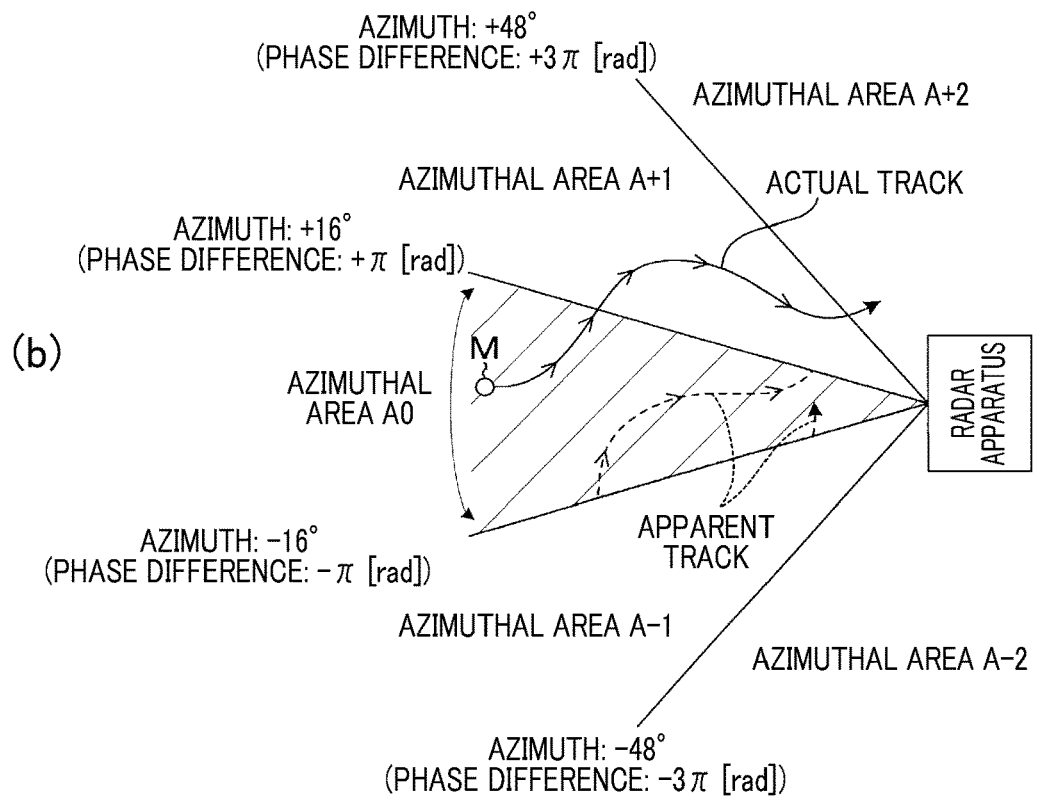

RADAR APPARATUS

CROSS-REFERENCE TO RELATED APPLICATION

This application is based on and claims the benefit of priority from earlier Japanese Patent Application No. 2014-204993 filed Oct. 3, 2014, the description of which is incorporated herein by reference.

TECHNICAL FIELD

The present invention relates to a radar apparatus that transmits and receives radar waves and then detects an object which has reflected the radar waves.

BACKGROUND ART

Conventionally, an on-vehicle radar apparatus is known. The on-vehicle radar apparatus emits radar waves (millimeter waves and other waves) as transmission waves across a predetermined angle around a vehicle for fixed periods of time, receives their reflected waves, and then detects objects around the vehicle.

In this type of radar apparatuses, methods, such as monopulse, phased array, multiple signal classification (MUSIC), and digital beam forming (DBF) are known, as an azimuth detection method for detecting the azimuth of a target which has reflected radio waves based on phase differences between signals received using a plurality of antenna elements.

These azimuth detection methods calculate an azimuth $\alpha$ of a target which has reflected radio waves based on a phase difference $\Delta\theta$ [rad] generated between reception signals that are received on channels, because a path difference $\Delta L$ of radio waves traveling between the target and the antenna elements is different depending on the combinations of the antenna elements (in the following, also referred to as "channels").

However, as shown in (a) in FIG. 13, in this case, a so-called phase wrapping occurs, which causes no difference in the phase difference between $\Delta\theta=\theta o$ ($|\theta o|<n$) and $\Delta\theta=\theta o \pm 2n\pi$ (n=1, 2, . . . ).

On this account, when a target is present in an azimuth angle region (in the following, referred to as "an azimuthal area") A0 corresponding to a range in which the phase difference $\Delta\theta$ is in a range of $-n$ to $+n$ [rad], the azimuth of the target can be correctly detected. However, when a target is present outside the azimuthal area A0, i.e., when a target is present in an azimuthal area Am corresponding to a range in which the phase difference $\Delta\theta$ is in a range of $(2m-1)n$ to $(2m+1)n$ [rad] (m is an integer not equal to zero), the azimuth of the target is falsely detected that the target is present in the azimuthal area A0 (see (b) in FIG. 13).

In other words, a so-called grating ghost is falsely detected as an actual target.

CITATION LIST

Patent Literature

[PTL 1] Japanese Patent No. 4082442

SUMMARY OF THE INVENTION

Technical Problem

Therefore, for example, in the case of a crossing object, such as a pedestrian (a crossing pedestrian), crossing a road (a traveling route) in the front area of a vehicle, or a stationary object present on the road, for example, a problem arises in that it is difficult to distinguish among a crossing object, a stationary object, and a ghost of a stationary object.

On this account, in the case in which a ghost is determined to be a crossing object or a stationary object, a problem arises in that the vehicle brakes unnecessarily, for example.

In view of the problems above, an object of the present invention is to provide a radar apparatus that can determine whether an object present on a road in the front of a vehicle is a crossing object crossing on a traveling route, a stationary object present on the traveling route, or a ghost of a stationary object.

Solution to Problem (1) A radar apparatus according to the present invention is a radar apparatus installed on a vehicle with a predetermined detection limit angle ($\pm\theta c$) to a front area of the vehicle, the radar apparatus transmitting radar waves externally from the vehicle, receiving reflected waves of the transmitted radar waves, and detecting information about a target which has reflected the radar waves, the radar apparatus characterized by: a relative velocity calculating unit that calculates a relative velocity (Vr) between the target and the radar-apparatus-installed vehicle based on information about the target which has reflected the radar waves; a radar-apparatus-installed vehicle velocity acquiring unit that acquires a velocity (Vn) of the radar-apparatus-installed vehicle; and a determining unit that compares a ratio (−Vr/Vn) of the relative velocity (Vr) to the velocity (Vn) of the radar-apparatus-installed vehicle with a determination value ($\alpha$) that is a cosine (cos $\theta c$) of the detection limit angle ($\pm\theta c$) or the cosine (cos $\theta c$) plus a correction value including a measurement error. When a determination is made by the determining unit that the ratio (−Vr/Vn) exceeds the determination value ($\alpha$), a determination is made that the target is a real target of a stationary object or a crossing object crossing a traveling route in the front area of the radar-apparatus-installed vehicle, and when a determination is made that the ratio (−Vr/Vn) is the determination value ($\alpha$) or less, a determination is made that the target is a ghost of the stationary object or the crossing object.

In the present invention, for example, as illustrated in FIG. 1, the ratio (−Vr/Vn) of the relative velocity (Vr) to the velocity of the radar-apparatus-installed vehicle (the radar-apparatus-installed vehicle velocity: Vn) is compared with the determination value ($\alpha$) that is a cosine (cos $\theta c$) of the detection limit angle ($\pm\theta c$) or the cosine (cos $\theta c$) plus a correction value including a measurement error.

When a determination is made that the ratio (−Vr/Vn) exceeds the determination value ($\alpha$), the target is determined to be a real target of a crossing object, such as a crossing pedestrian, or a stationary object, whereas when a determination is made that the target is not a real target, the target is determined to be a ghost of a crossing object or a stationary object.

Thus, a real target of a crossing object or a stationary object can be distinguished from a ghost of a stationary object. Accordingly, an effect is exerted, for example, in which a ghost is not falsely determined to be a real target, for preventing inappropriate brake control.

Here, by the determination described above, the principle that allows a real target of a crossing object or a stationary object to be distinguished from a ghost of a stationary object will be described in detail later.

Note that, the correction value may be appropriately set by experiment, for example, adding a measurement error and the like.

In the present invention, the relative velocity (Vr) is a relative velocity based on the Doppler effect (the Doppler frequency). Here, when the traveling direction of the vehicle is positive (+) for the direction of the velocity, an object coming close to the vehicle at a predetermined velocity is expressed with negative speed (−). In the following, the same thing is applied.

The detection limit angle (±θc) is a limit angle (e.g. ±22 degrees) in which the radar apparatus can recognize targets. For example, as shown in FIG. 2, when viewed from above the road, i.e., in a plan view, the detection limit angle is angles in a range of −θc on the left side and +θc on the right side to the front area of the vehicle (the traveling direction is the Y-direction). In the following, the same thing is applied.

(2) A radar apparatus according to the present invention is a radar apparatus installed on a vehicle, the radar apparatus transmitting radar waves externally from the vehicle, receiving reflected waves of the transmitted radar waves, and detecting information about a target which has reflected the radar waves, the radar apparatus characterized by: a radar-apparatus-installed vehicle velocity acquiring unit that acquires a velocity (Vn) of a radar-apparatus-installed vehicle; an azimuth angle calculating unit that calculates an azimuth angle (θest) of a main target based on information about the target which has reflected the radar waves; a grating angle calculating unit that calculates a left grating angle (θgrt1) and a right grating angle (θgrt2) to the main target; an estimated longitudinal velocity calculating unit that calculates a main estimated longitudinal velocity (Vy_est) of the main target, a first estimated longitudinal velocity (Vy_grt1) of a first target having the left grating angle (θgrt1), and a second estimated longitudinal velocity (Vy_grt2) of a second target having the right grating angle (θgrt2); a first determining unit that compares the main estimated longitudinal velocity (Vy_est) of the main target with the velocity (Vn) of the radar-apparatus-installed vehicle, in which when the main estimated longitudinal velocity (Vy_est) of the main target and the velocity (Vn) of the radar-apparatus-installed vehicle are substantially equal, a determination is made that the main target is a real target; and a second determining unit that compares the first estimated longitudinal velocity (Vy_grt1) of the first target with the velocity (Vn) of the radar-apparatus-installed vehicle, in which when the first estimated longitudinal velocity (Vy_grt1) of the first target and the velocity (Vn) of the radar-apparatus-installed vehicle are substantially equal, a determination is made that the target determined whose longitudinal velocity is equal to the radar-apparatus-installed vehicle velocity is a ghost of a stationary object, or that compares the second estimated longitudinal velocity (Vy_grt2) of the second target with the velocity (Vn) of the radar-apparatus-installed vehicle, in which when the second estimated longitudinal velocity (Vy_grt2) of the second target and the velocity (Vn) of the radar-apparatus-installed vehicle are substantially equal, a determination is made that the target determined whose longitudinal velocity is equal to the radar-apparatus-installed vehicle velocity is a ghost of a stationary object.

In the present invention, the main estimated longitudinal velocity (Vy_est) of the main target is compared with the velocity of the radar-apparatus-installed vehicle (the radar-apparatus-installed vehicle velocity: Vn). When the main estimated longitudinal velocity (Vy_est) of the main target and the radar-apparatus-installed vehicle velocity (Vn) are substantially equal, a determination is made that the main target is the real target.

The first estimated longitudinal velocity (Vy_grt1) of the first target is compared with the radar-apparatus-installed vehicle velocity (Vn). When the first estimated longitudinal velocity (Vy_grt1) of the first target and the radar-apparatus-installed vehicle velocity (Vn) are substantially equal, a determination is made that the target determined whose longitudinal velocity is equal to the radar-apparatus-installed vehicle velocity is a ghost of a stationary object. Alternatively, the second estimated longitudinal velocity (Vy_grt2) of the second target is compared with the radar-apparatus-installed vehicle velocity (Vn). When the second estimated longitudinal velocity (Vy_grt2) of the second target and the radar-apparatus-installed vehicle velocity (Vn) are substantially equal, a determination is made that the target determined whose longitudinal velocity is equal to the radar-apparatus-installed vehicle velocity is a ghost of a stationary object.

Thus, the real target of a stationary object can be distinguished from its ghost.

Accordingly, the real target of a stationary object can be distinguished from its ghost, and hence an effect is exerted, for example, in which a ghost is not falsely determined to be a real target for preventing inappropriate brake control.

Here, the principle in which the real target of a stationary object can be distinguished from its ghost by the determination described above will be described in detail later.

Note that, the term "substantially" means a range including measurement errors and the like more or less, which may be appropriately set by experiment and the like. For example, having a difference in a range of ±5% can be determined as "substantially equal".

As shown in FIG. 2, under the conditions in which the main azimuth angle of the target is considered (θest: an angle relative to the longitudinal direction of the vehicle), the left grating angle (θgrt1) and the right grating angle (θgrt2) are angles, which are angles relative to the longitudinal direction of the vehicle, in the occurrence of ghosts on the left side of or on the right side of the main target when viewed from above the road (in a plan view).

The longitudinal velocity is the velocity in the longitudinal direction (in the traveling direction) of the radar-apparatus-installed vehicle.

The foregoing description, and other objects, features, and advantages of the present invention will be easily apparent from the detailed description and the accompanying drawings, which will be fully understood.

BRIEF DESCRIPTION OF THE DRAWINGS

FIG. 4 is a flowchart of a target information generating process performed in the radar apparatus according to the first embodiment.

FIG. 5A is a flowchart of a ghost determining process according to the first embodiment.

FIG. 7 shows explanatory diagrams; (a) in the case of a real target of a crossing pedestrian, (b) in the case of a real target of a stationary object, and (c) in the case of a ghost of a stationary object.

FIG. 13 shows diagrams illustrative of a previously existing technique.

DESCRIPTION OF EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

(First Embodiment)
(Overall Structure of a System)

First, the overall structure of a vehicle control system, in which a radar apparatus according to a first embodiment is used, will be described. Note that, here, a system for automatic cruise control is taken and described as an example. However, the present invention is not limited to this example.

Figure 1:
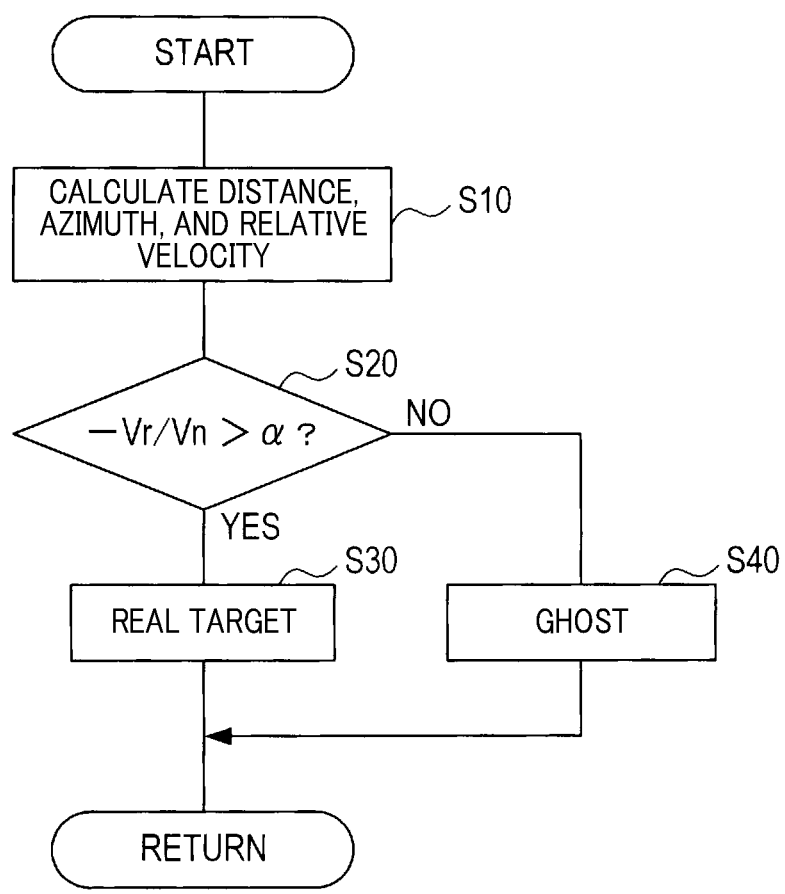
FIG. 1 is a diagram illustrative of a method for distinguishing a real target of a crossing object or a stationary object from a ghost of a stationary object according to the present invention.
Figure 2:
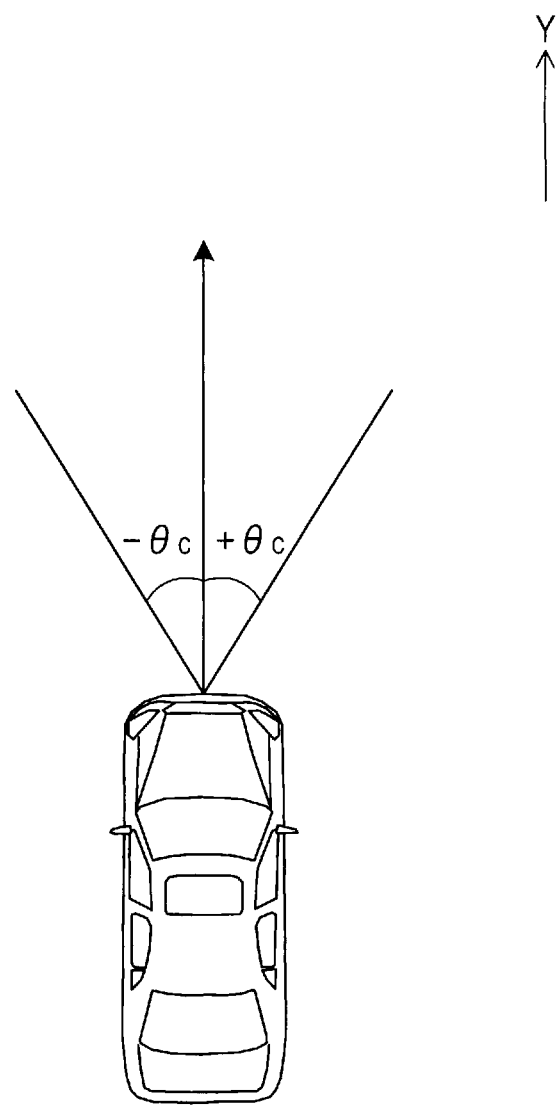
FIG. 2 is a diagram illustrative of the detection limit angle of a radar apparatus when viewed from above a road.
Figure 3:
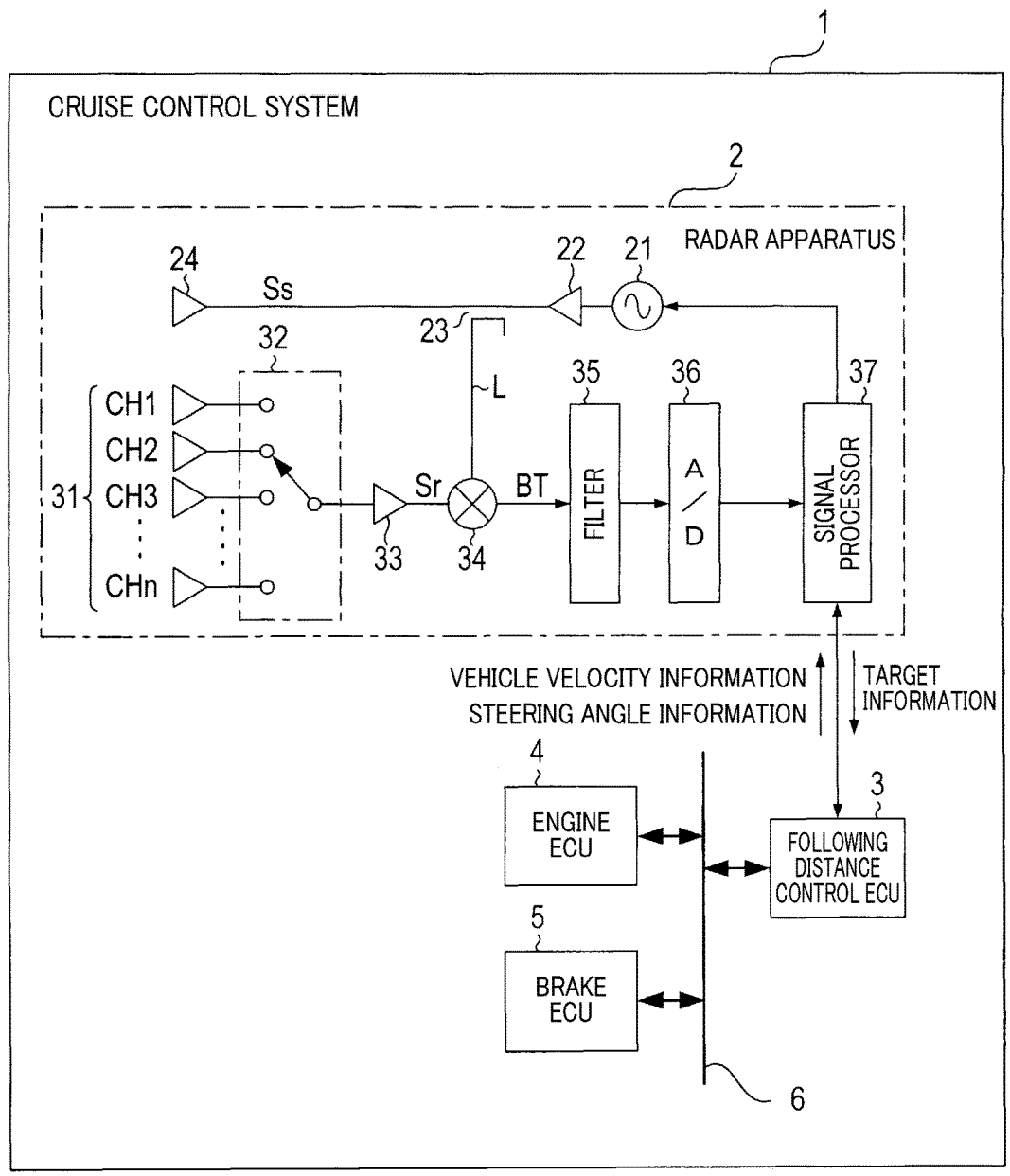
FIG. 3 is a block diagram of a cruise control system in which a radar apparatus according to a first embodiment is used.

As shown in FIG. 3, a cruise control system 1 is a system installed on a vehicle, which includes a radar apparatus 2, a following distance control electronic controller (in the following, referred to as a following distance control electronic control unit (ECU)) 3, an engine electronic controller (in the following, referred to as an engine ECU) 4, and a brake electronic controller (in the following, referred to as a brake ECU) 5. Note that, these ECUs 3, 4, are 5 are connected data-communicably to each other through an in-vehicle LAN 6.

Among these components, the radar apparatus 2 is configured as a so-called "millimeter wave radar" in FM-CW mode. The radar apparatus 2 transmits and receives frequency-modulated radar waves in a millimeter wave band to recognize objects, such as preceding vehicles and roadside objects, generates target information about preceding vehicles traveling in the front area of the radar-apparatus-installed vehicle based on the recognition results of them, and transmits the target information to the following distance control ECU 3. Note that the target information at least includes the relative velocity to the preceding vehicles and the positions (distances and azimuths) of the preceding vehicles.

In the configuration of the brake ECU 5, the brake ECU 5 determines a state of a brake pedal based on information from a master cylinder pressure sensor, not shown, as well as based on detection information (steering angles and yaw rates) from a steering sensor and a yaw rate sensor, not shown, and transmits the state of the brake pedal to the following distance control ECU 3. The brake ECU 5 receives data and requests, such as a target acceleration and a brake request, from the following distance control ECU 3, and controls braking force by driving a brake actuator that opens and closes a pressure-increasing control valve and a pressure-decreasing control valve provided on a brake oil hydraulic circuit, according to the items of the received information and the determined brake state.

In the configuration of the engine ECU 4, the engine ECU 4 transmits detection information (vehicle velocities, engine control states, and accelerator operation states) from a vehicle velocity sensor, a throttle opening sensor, and an accelerator pedal opening sensor, not shown, to the following distance control ECU 3. The engine ECU 4 receives data and requests, such as a target acceleration and a fuel cut off request, from the following distance control ECU 3, and outputs a drive command to devices including a throttle actuator that adjusts the throttle opening of an internal combustion engine suitable for driving states determined from the items of received information.

The following distance control ECU 3 receives data, such as vehicle velocities and engine control states, from the engine ECU 4 and data, such as steering angles, yaw rates, and brake control states, from the brake ECU 5. Based on set values from switches, such as a cruise control switch and a target following distance setting switch, not shown, and target information received from the radar apparatus 2, the following distance control ECU 3 transmits data and requests, such as a target acceleration and a fuel cut off request, to the engine ECU 4 and transmits data and requests, such as a target acceleration and a brake request, to the brake ECU 5, as control commands for adjusting the following distance to a preceding vehicle to a suitable distance.

(Configuration of the Radar Apparatus)

Next, the configuration of the radar apparatus 2 will be described.

The radar apparatus 2 includes an oscillator 21 that generates a high frequency signal in a millimeter wave band modulated to have a rising section, in which the frequency is linearly increased with respect to time, and a falling section, in which the frequency is linearly decreased, an amplifier 22 that amplifies the high frequency signal generated by the oscillator 21, a distributor 23 that power-distributes the output of the amplifier 22 to a transmission signal Ss and a local signal Ls, a transmission antenna 24 that emits radar waves corresponding to the transmission signal Ss, and a reception antenna unit 31 formed of n reception antennas that receive radar waves.

The radar apparatus 2 includes a reception switch 32 that sequentially selects any one of antennas configuring the reception antenna unit 31 and supplies a reception signal Sr from the selected antenna to a subsequent stage, an amplifier 33 that amplifies the reception signal Sr supplied from the reception switch 32, a mixer 34 that mixes the reception signal Sr amplified at the amplifier 33 with the local signal L to generate a beat signal BT, a filter 35 that removes unnecessary signal components from the beat signal BT generated at the mixer 34, and an A/D converter 36 that samples the output of the filter 35 and converts the sampled data to digital data.

The radar apparatus 2 further includes a signal processor 37. The signal processor 37 controls the starting and stopping of the oscillator 21 and the sampling of the beat signals BT through the A/D converter 36. The signal processor 37 performs signal processing using sampled data and communicates with the following distance control ECU 3 for transmitting and receiving information necessary for signal processing (vehicle velocity information) and target information obtained as a result of the signal processing (target information and other information).

Among these components, the antennas configuring the reception antenna unit 31 are each set so that the beam width of the antennas includes the entire beam width of the transmission antenna 24. Channels CH1 to CHn are allocated to the respective antennas.

The signal processor 37 is mainly configured of a known microcomputer, and further includes an arithmetic processing unit (e.g. digital signal processor (DSP)) for performing processes, such as fast Fourier transform (FFT), on data captured through the A/D converter 36.

(Basic Operation of the Radar Apparatus)

Next, the basic operation of the radar apparatus 2 will be described.

In the radar apparatus 2 according to the first embodiment thus configured, after the oscillator 21 is activated in response to a command from the signal processor 37, first, the oscillator 21 generates a high frequency signal, and the amplifier 22 amplifies this high frequency signal. The distributor 23 power-distributes the high frequency signal to generate a transmission signal Ss and a local signal L. In the signals, the transmission signal Ss is sent as radar waves through the transmission antenna 24.

Reflected waves, which are the radar waves sent from the transmission antenna 24, reflected off an object, and returned, are received by all the reception antennas configuring the reception antenna unit 31. Only the reception signal Sr of a reception channel CHi (i=1 to n) selected by the reception switch 32 is amplified at the amplifier 33, and then supplied to the mixer 34.

The mixer 34 mixes the reception signal Sr with the local signal L from the distributor 23 to generate a beat signal BT. After unnecessary signal components are removed from the beat signal BT at the filter 35, the beat signal BT is sampled at the A/D converter 36, and then captured by the signal processor 37.

Note that, the reception switch 32 is switched so as to select all the channels CH1 to CHn for a predetermined number of times (e.g. 512 times) during one modulation cycle of the radar waves. The A/D converter 36 samples data in synchronization with the switching timing. In other words, during one modulation cycle of the radar waves, sampled data is accumulated for each of the channels CH1 to CHn and in each of the rising and the falling sections of the radar waves.

The signal processor 37 of the radar apparatus 2 performs a signal analysis process in which in each lapse of one modulation cycle, sampled data stored in the cycle is subjected to FFT processing at each of the channels CH1 to CHn and in each of the rising and the falling sections of the radar waves, a target information generating process in which a preceding vehicle is detected to generate target information according to the analysis result in the signal analysis process, and other processes.

Note that, since the signal analysis process is a known technique, the description is omitted here.

(Target Information Generating Process)

Next, the procedures of the target information generating process performed by the signal processor 37 will be described.

As shown in FIG. 4, the target information generating process is activated every time when the result of FFT processing is calculated based on sampled data for one modulation cycle in the signal analysis process.

After the process is activated, first, in Step S100, the signal processor 37 activates the oscillator 21 to start the transmission of radar waves.

Subsequently, in Step S110, the signal processor 37 samples and captures beat signals BT outputted from the A/D converter 36 by a lapse of one period formed of a rising section in which the frequency is gradually increased and a falling section in which the frequency is gradually decreased.

After a lapse of one period formed of the rising section and the falling section, in Step S120, the signal processor 37 stops the oscillator 21 to halt the transmission of the radar waves.

Subsequently, in Step S130, the signal processor 37 subjects the sampled data captured in the process in Step S120 to a frequency analysis process (here, FFT processing) for calculating the power spectrum of the beat signal BT for each of the reception channels CH1 to CHn and in each of the rising and the falling sections. The power spectrum expresses frequencies included in the beat signal BT and the intensities at the respective frequencies.

In Step S140, frequency peaks fbu1 to fbum present on the power spectrum are detected in the rising section, and frequency peaks fbd1 to fbdm present on the power spectrum are detected in the falling section. Note that, the detected frequency peaks fbu and fbd mean that a candidate of a recognized target is possibly present (in the following, referred to as a target candidate). The target in the first embodiment expresses a point of an object, such as a crossing object and a stationary object, at which radar waves are reflected off.

Specifically, an average spectrum, which is an arithmetic mean of the power spectrum found at each of the reception channels CH in all the reception channels, is derived. Frequencies corresponding to the peak points of frequencies whose intensities exceed a preset threshold in the average spectrum (i.e., the intensity is at the maximum in the average spectrum) are detected as the frequency peaks fbu and fbd.

In Step S150, based on phase difference information and other information about the signal components of the same peak frequencies acquired from the channels CH1 to CHn, an azimuth at which a target identified by the peak frequencies is present (in the following, referred to as a peak azimuth) is calculated using a known method, MUSIC or digital beam forming (DBF), for example, on the frequency peaks fbu and fbd.

In Step S160, pair matching is performed, in which the frequency peak fbu and the frequency peak fbd are combined based on the same target. Specifically, it is determined whether in a combination of the frequency peak fbu in the rising section and the frequency peak fbd in the falling section, the difference of the peak intensity and the difference of the angle of the peak azimuth are within a preset tolerance. As a result of the determination, when the difference of the peak intensity and the difference of the angle of the peak azimuth are both within the tolerance, a set of the corresponding frequency peaks is registered as a peak pair.

After that, in Step S170, by a known method for radar apparatuses in FM-CW mode, a distance from the radar apparatus 2 to a target candidate and the relative velocity of the target candidate to the radar-apparatus-installed vehicle are calculated for the registered peak pair.

In Step S180, based on the distance calculated in Step S170 and the peak azimuth calculated in Step S160, the longitudinal position and the lateral position of the registered peak pair are calculated. Note that, the longitudinal position is a position along the traveling direction of the radar-apparatus-installed vehicle as the radar-apparatus-installed vehicle is the starting point, and the lateral position is a position along the crosswise direction of the radar-apparatus-installed vehicle as the radar-apparatus-installed vehicle is the starting point. Thus, the longitudinal position, the lateral position, and the relative velocity of the registered peak pair are identified.

In Step S190, a history tracking process is performed in which for each peak pair registered in the measurement cycle this time (in the following, referred to as a present cycle pair), it is determined whether the present cycle pair expresses the same target as a pair registered at the previous measurement cycle (in the following, referred to as a previous cycle pair), i.e., whether there is a history connection.

Specifically, based on information about the previous cycle pair, the predicted position and the predicted velocity of the present cycle pair corresponding to the previous cycle pair are calculated. In the case in which the differentials (the position differential and the velocity differential) of the predicted position and the predicted velocity from the detected position and the detected velocity found from the present cycle pair are smaller than preset upper limits (an upper limit position difference and an upper limit velocity difference), a determination is made that a history connection is present. A peak pair, which is determined that the peak pair has history connections for a plurality of measurement cycles (e.g. five cycles), is recognized as a target.

After that, in Step S200, a ghost determining process, described in detail later, is performed to determine whether the recognized target is a real target of an object, such as a crossing object or a stationary object, for example, or a ghost of a stationary object.

Subsequently, in Step S210, a target determined to be a real target is confirmed as a target to be recognized in controlling the vehicle, data (target information) of the target is outputted to the following distance control EUC 3, for example, and then the process is temporarily ended.

(Ghost Determining Process)

Next, the ghost determining process performed in Step S200 will be described.

As shown in FIG. 5A, in Step S300, in order to count the number of targets to be determined, a target counter is incremented by one.

Subsequently, in Step S310, a relative velocity Vr of the target obtained in Step 170 and a radar-apparatus-installed vehicle velocity Vn are acquired.

Note that, the relative velocity Vr means a relative velocity based on a Doppler frequency observed by the radar apparatus, which can be calculated by Expression (6) below.

$$Vr = Vx \cdot \sin\theta + Vn \cdot \cos\theta \quad (6)$$

Figure 6:
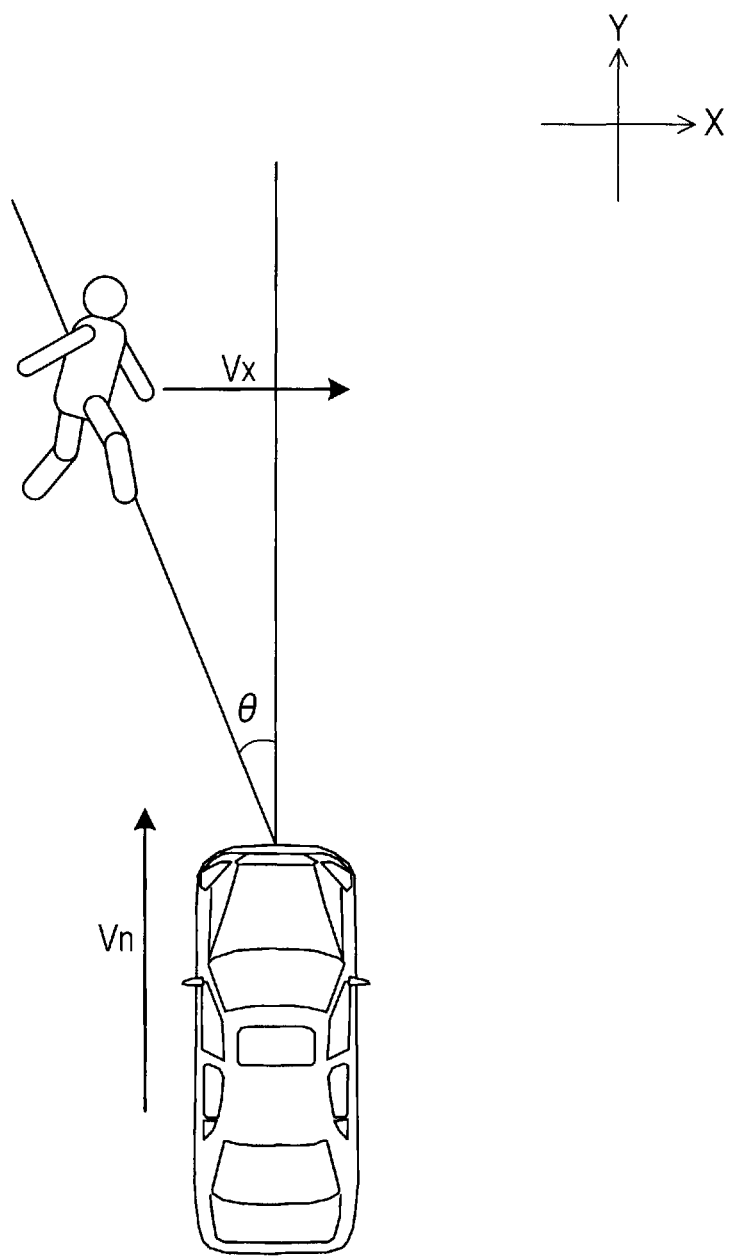
FIG. 6 is a diagram illustrative of the relationship between the moving state of a crossing pedestrian and the running state of a vehicle.

Here, as shown in FIG. 6, Vx is a velocity component of a crossing pedestrian, i.e., a velocity component in a direction (the X-direction, i.e., the lateral direction) perpendicular to the traveling direction of the radar-apparatus-installed vehicle (the Y-direction), Vn is a radar-apparatus-installed vehicle velocity (the velocity in the Y-direction), and θ is an angle (an azimuth angle) of the crossing pedestrian relative to the traveling direction of the radar-apparatus-installed vehicle.

Note that, in the case of a target is a stationary object, the velocity component Vx in the lateral direction is zero. Thus, typically, the relative velocity Vr of the crossing pedestrian coming closer to the radar-apparatus-installed vehicle, who is crossing in the right direction in FIG. 6, for example, is a value greater than the value of the relative velocity Vr of a stationary object.

Note that, the velocity of the radar-apparatus-installed vehicle (the radar-apparatus-installed vehicle velocity: Vn) is obtained from the following distance control ECU 3.

Subsequently, in Step S320, based on Expression (7) below, it is determined whether the target is a real target of a crossing pedestrian or a stationary object or a ghost of a stationary object. In other words, it is determined whether "−Vr/Vn" is greater than a determination value α.

$$-Vr/Vn > \alpha \quad (7)$$

Here, in the case in which the detection limit angle of the radar apparatus is ±θc, cos θc can be adopted for α. However, practically, it is desirable to adopt a value with a slight correction, taking into account the observation error of the relative velocity Vr. Specifically, the value of cos θc+an error ΔG can be adopted as α. For example, in the case of θc=22 degrees, cos θc=0.927. However, 0.9, for example, is adopted, taking into account an error.

Note that, in Expression (2), negative (−) expresses the direction opposite to the traveling direction of the vehicle. In the following, the same thing is applied in other expressions.

In Step S320, when a determination is made that "−Vr/Vn" is greater than α, the process goes to Step S330, and a determination is temporarily made that the target of an object to be determined is a real target of a crossing pedestrian or a stationary object.

A decrement process is performed in which a ghost counter used for determining whether the target is a ghost is decremented (e.g. a decrement by one), and then the process is temporarily ended.

On the other hand, in Step S320, when a determination is made that "−Vr/Vn" is a or less, the process goes to Step S340, and a determination is temporarily made that the target of an object to be determined is a ghost of a crossing pedestrian or a stationary object.

A process is performed in which the ghost counter used for determining whether the target is a ghost is incremented (e.g. an increment by one), and the process temporarily goes to the process.

Note that, the process is sequentially performed on the targets of a plurality of detected objects to be determined. In other words, the number of the targets of objects to be determined is sequentially counted by the target counter. After all the targets are counted, the first-time determination is ended.

The target detection by the radar apparatus 2 is repeatedly performed at each predetermined time interval as described above. Thus, after all the targets in the first-time determination (where, ones recognized as the same target) are determined for a plurality of times (e.g. three times), it is finally confirmed whether the target of an object to be determined is a real target or a ghost of a stationary object.

Specifically, the value of the ghost counter is increased or decreased after each determination.

In other words, the value of the ghost counter is more increased as the number of times of determination that the target is a ghost is greater. Thus, a predetermined determination value is set in advance by experiment, for example, and in the case in which the value of the ghost counter exceeds the determination value for the target of an object to be determined, the target can be confirmed as a ghost.

Similarly, the value of the ghost counter is more decreased as the number of times of determination that the target is a real target is greater. Thus, in the case in which the value of the ghost counter is below a predetermined determination value, the target can be confirmed as a real target.

Accordingly, only the target determined to be a real target of a crossing pedestrian or a stationary object is confirmed as a real target, and target information about the target is outputted.

(Principle of the Ghost Determining Process)

Next, the principle will be described, in which determination in Step S320 allows the real targets of a crossing pedestrian to be distinguished from a stationary object to be distinguished from a ghost of a stationary object.

In the case of the real targets of a stationary object and a crossing pedestrian coming close to the radar-apparatus-installed vehicle, when the determination threshold is α=cos θc, −Vr/Vn>cos θc.

Specifically, as shown in (a) in FIG. 7, in the case of a crossing pedestrian (a real target), "Vr=Vx·sin θ+Vn·cos θ", and a component Vx in the lateral direction is present. Then, "−Vr/Vn>cos θc".

As shown in (b) in FIG. 7, in the case of a stationary object (a real target), "Vr=Vn·cos θ, (where −θc<e<θc)", no component Vx in the lateral direction is present, and the azimuth angle θ is within a range of the detection limit angle ±θc of the radar apparatus 2. Then, "−Vr/Vn>cos θc".

On the other hand, as shown in (c) in FIG. 7, in the case of a ghost of a stationary object, "Vr=Vn·cos θ, (where, |θ|>|θc|)", and the actual azimuth angle θ (the absolute value) of the stationary object is greater than the detection limit angle θc (the absolute value). Then, "−Vr/Vn<cos θc".

Here, in the case of "−Vr/Vn=cos θc", the target is assumed as a ghost of a stationary object. In the following, the same thing is applied. However, the target may be assumed as a real target of a crossing pedestrian or a stationary object.

Figure 8:
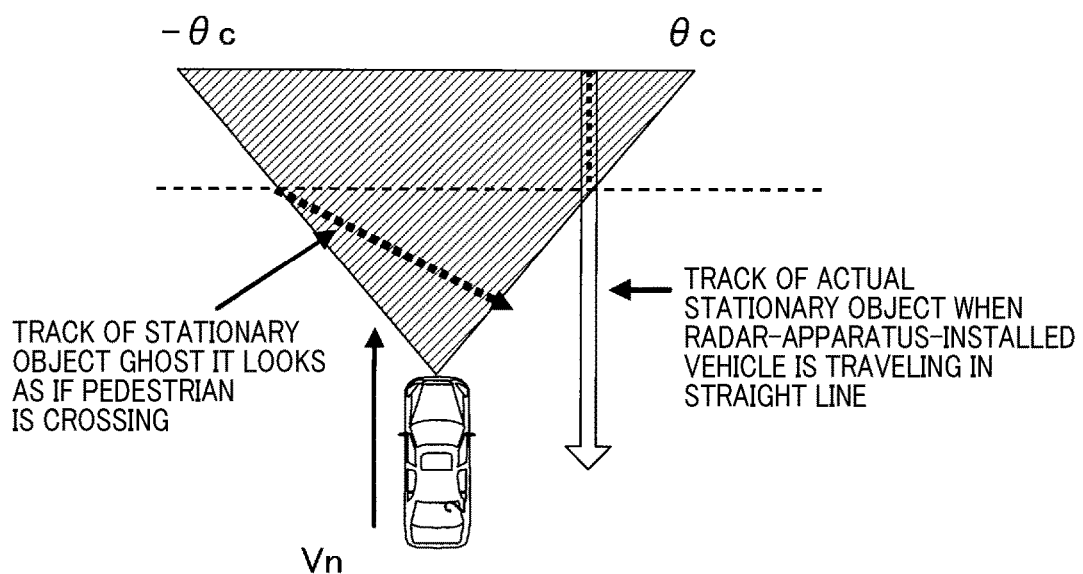
FIG. 8 is a diagram illustrative of a problem of a ghost of a stationary object.

Note that, as shown in FIG. 8, a ghost of a stationary object looks as if a pedestrian is crossing. Thus, it is necessary to distinguish the real targets of a crossing pedestrian and a stationary object from a ghost of a stationary object by the determination described above.

(Effect of the Radar Apparatus 2)

Next, the effect of the radar apparatus 2 according to the first embodiment will be described. As illustrated in FIG. 5A, in the first embodiment, the ratio (−Vr/Vn) of the relative velocity (Vr) to the radar-apparatus-installed vehicle velocity (Vn) is compared with a determination value (α) that is the cosine (cos θc) of the detection limit angle (±θc) or the cosine (cos θc) plus a correction value including a measurement error.

When a determination is made that the ratio (−Vr/Vn) exceeds the determination value (α), the target is determined to be a real target of a crossing object, such as a crossing pedestrian, or a stationary object, whereas when a determination is made that the target is not a real target, the target is determined to be a ghost of a crossing object or a stationary object.

Thus, a real target of a crossing object or a stationary object can be distinguished from a ghost of a stationary object. Accordingly, an effect is exerted, for example, in which a ghost is not falsely determined to be a real target, for preventing inappropriate brake control.

Note that, targets other than a crossing object, such as a pedestrian, and a stationary object can be distinguished by a variety of known processes. For example, in the case in which a target is a preceding vehicle, the preceding vehicle travels at almost the same velocity as the radar-apparatus-installed vehicle velocity in the same direction. Thus, typically, the relative velocity of the preceding vehicle to the radar-apparatus-installed vehicle is almost equal to zero or small. On the other hand, the velocity of a crossing object or a stationary object is almost equal to zero in the traveling direction of the radar-apparatus-installed vehicle. Thus, the relative velocity of the crossing object or the stationary object to the radar-apparatus-installed vehicle is almost equal to the radar-apparatus-installed vehicle velocity.

Accordingly, based on such differences in the relative velocity, the preceding vehicle can be easily distinguished from a crossing object or a stationary object.

Figure 5B:
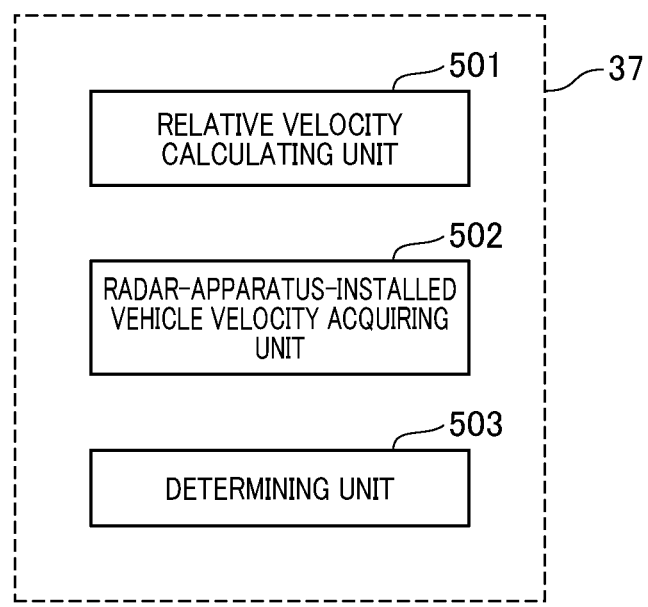
FIG. 5B is a functional block diagram of a signal processor of the radar apparatus according to the first embodiment.

FIG. 5B is a functional block diagram showing the functions of the signal processor 37 according to the first embodiment, which are embodied by a processor, software, or these combinations of them. The signal processor 37 includes a relative velocity calculating unit 501, a radar-apparatus-installed vehicle velocity acquiring unit 502, and a determining unit 503. The relative velocity calculating unit 501 and the radar-apparatus-installed vehicle velocity acquiring unit 502 perform the process in Step S310. The determining unit 503 performs the processes in Steps S320 to S340.

(Second Embodiment)

Next, the second embodiment will be described. However, the description of the content similar to the description of the first embodiment is omitted.

The second embodiment is different from the first embodiment in the content of the ghost determining process), and the different content will be described.

Note that, in the second embodiment, it is determined whether a stationary object is a real target or a ghost.

a) First, the procedures of a ghost determining process according to the second embodiment will be described.

Figure 9A:
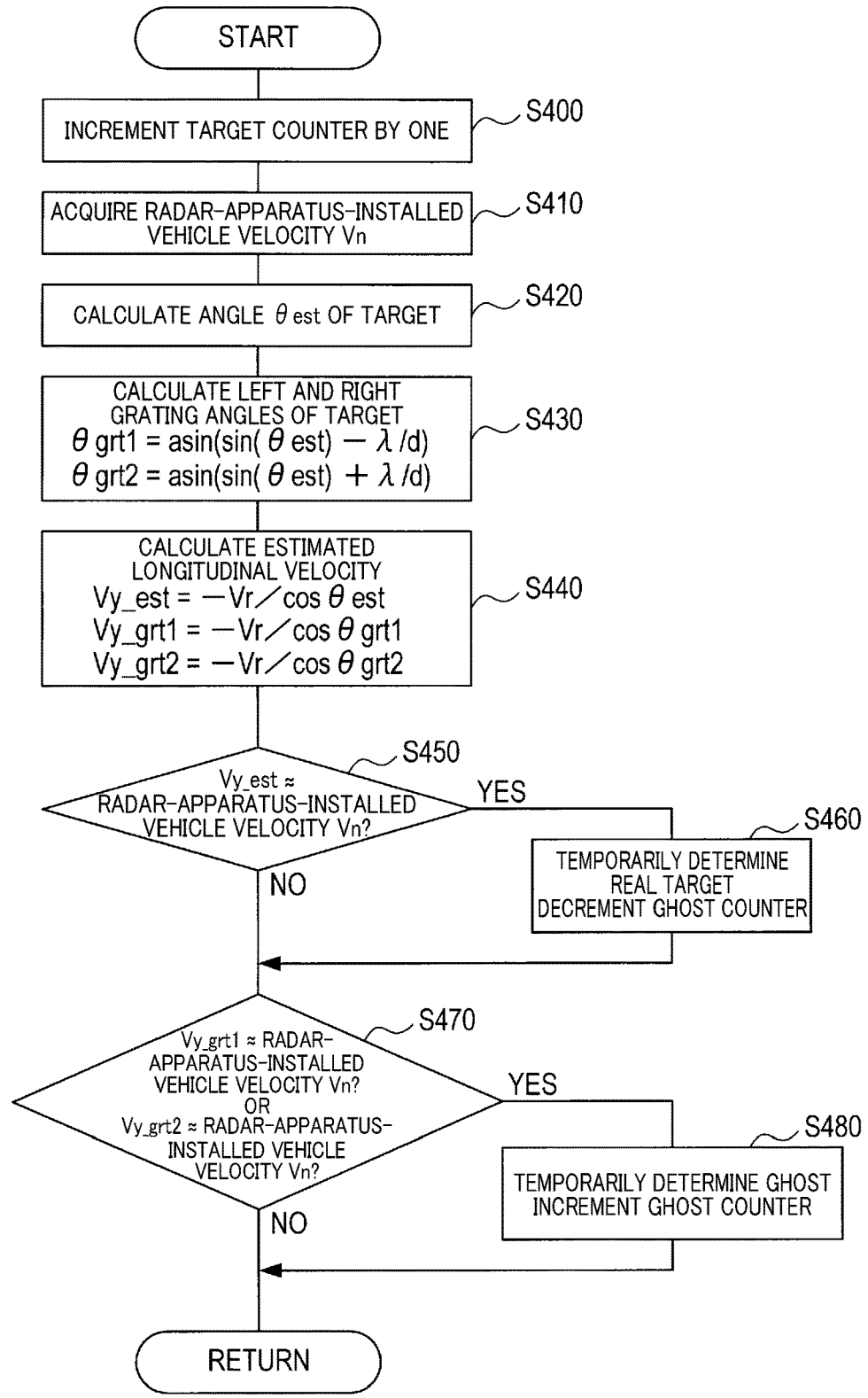
FIG. 9A is a flowchart of a ghost determining process according to a second embodiment.

As shown in FIG. 9A, in Step S400, the target counter is incremented by one.

Subsequently, in Step S410, the radar-apparatus-installed vehicle velocity (Vn) is acquired from the following distance control ECU 3.

Subsequently, in Step S420, an angle (an estimation angle: a radar output azimuth) θest, which is the azimuth angle of the target (an angle relative to the traveling direction of the vehicle), is calculated. Specifically, the azimuth of the target (in detail, the azimuth of a target to be determined this time) determined in Step S150 is acquired.

Subsequently, in Step S430, left and right grating angles θgrt1 and θgrt2 of the target of an object to be determined this time are calculated by Expressions (1) and (2) below.

Note that, in the plan view (when viewed from above), to a target (B0) of an object to be determined, θgrt1 is the grating angle of an assumed target (θL) on the left side, and θgrt2 is the grating angle of an assumed target (BR) on the right side.

$$\theta grt1 = a\sin(\sin(\theta est) - \lambda/d) \quad (1)$$

$$\theta grt2 = a\sin(\sin(\theta est) + \lambda/d) \quad (2)$$

(where, λ is a wavelength [m], and d is an antenna element gap [m])

Subsequently, in Step S440, an estimated longitudinal velocity Vy_est of the target (the main target: B0) at an angle θest, an estimated longitudinal velocity Vy_grt1 of a target (a first target: BL) at a left-side grating angle θgrt1, and an estimated longitudinal velocity Vy_grt2 of a target (a second target BR) at a right-side grating angle θgrt2 are calculated from Expressions (3), (4), and (5) below.

Note that, in the expressions, negative (−) expresses the direction opposite to the traveling direction of the vehicle.

$$Vy\_est = -Vr/\cos \theta est \quad (3)$$

$$Vy\_grt1 = -Vr/\cos \theta grt1 \quad (4)$$

$$Vy\_grt2 = -Vr/\cos \theta grt2 \quad (5)$$

(where, Vr is the relative velocity [m/s] by Doppler).

Subsequently, in Step S450, it is determined whether the estimated longitudinal velocity Vy_est of the main target (B0) is approximately matched with the radar-apparatus-installed vehicle velocity Vn. In other words, it is determined whether the estimated longitudinal velocity Vy_est falls within a range of a predetermined error ΔT. Here, when an Yes determination is made, the process goes to Step S460, whereas when a No determination is made, the process goes to Step S470.

In Step S460, the estimated longitudinal velocity Vy_est of the main target (B0) is approximately matched with the radar-apparatus-installed vehicle velocity Vn, and hence a determination is temporarily made that the target (B0) is a real target. A process is performed in which the ghost counter used for determining whether the target is a ghost is decremented (e.g. a decrement by one), and then the process goes to Step S470.

On the other hand, in Step S470, it is determined whether the estimated longitudinal velocity Vy_grt1 of the first target (BL) on the left side is approximately matched with the radar-apparatus-installed vehicle velocity Vn (within a range of a predetermined error ΔT), or whether the estimated longitudinal velocity Vy_grt2 of the second target (BR) on the right side is approximately matched with the radar-apparatus-installed vehicle velocity Vn (within a range of a predetermined error ΔT).

Here, when an Yes determination is made, the process goes to Step S480, whereas when a No determination is made, the process is temporarily ended.

In Step S480, the estimated longitudinal velocity Vy_grt1 of the first target (BL) on the left side, or the estimated longitudinal velocity Vy_grt2 of the second target (BR) on the right side is approximately matched with the radar-apparatus-installed vehicle velocity Vn. Thus, a determination is temporarily made that the first or the second target (BL or BL) is a ghost. A process is performed in which the ghost counter is incremented (e.g. an increment by one), and then the process is temporarily ended.

Note that, the process is sequentially performed on the targets of a plurality of detected objects to be determined. In other words, the number of the targets of objects to be determined is sequentially counted by the target counter. After all the targets are counted, the first-time determination is ended.

The target detection by the radar apparatus 2 is repeatedly performed at each predetermined time interval as described above. Thus, after all the targets in the first-time determination (where, ones recognized as the same target) are determined for a plurality of times (e.g. three times), it is finally confirmed whether the target of an object to be determined is a real target or a ghost of a stationary object.

Specifically, the value of the ghost counter is increased or decreased in determination at each time. In other words, the value of the ghost counter is more increased as the number of times of determination that the target is a ghost is greater. Thus, a predetermined determination value is set in advance by experiment, for example, and in the case in which the value of the ghost counter exceeds the determination value for the target of an object to be determined, the target can be confirmed as a ghost.

Similarly, the value of the ghost counter is more decreased as the number of times of determination that the target is a real target is greater. Thus, in the case in which the value of the ghost counter is below a predetermined determination value, the target can be confirmed as a real target.

Accordingly, only the target determined to be a real target is confirmed as a real target, and target information about the target is outputted.

Note that, in the case in which a No determination is made in Steps S320 and S450, neither a real target nor a ghost is temporarily determined, and the process of determining other targets and other processes are continued.

b) Next, the principle will be described, in which a real target of a stationary object can be distinguished from its ghost by the ghost determining process according to the second embodiment.

Figure 10:
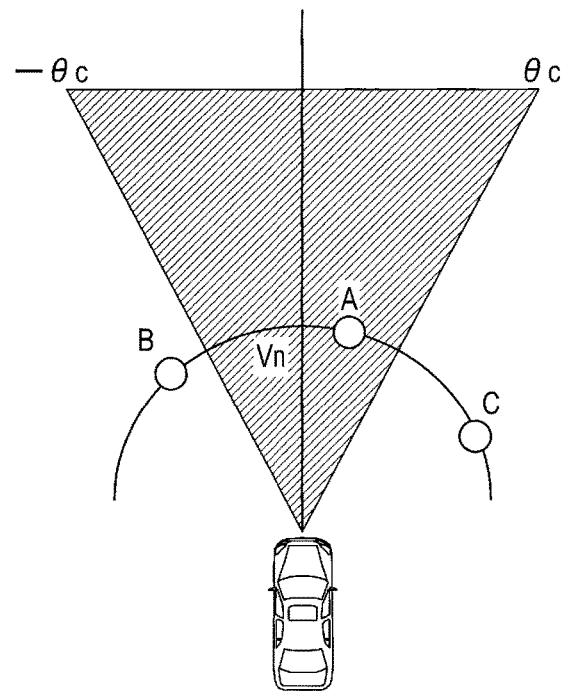
FIG. 10 is a diagram illustrative of the relationship between the positions of real targets and the output of the radar apparatus.
Figure 11:
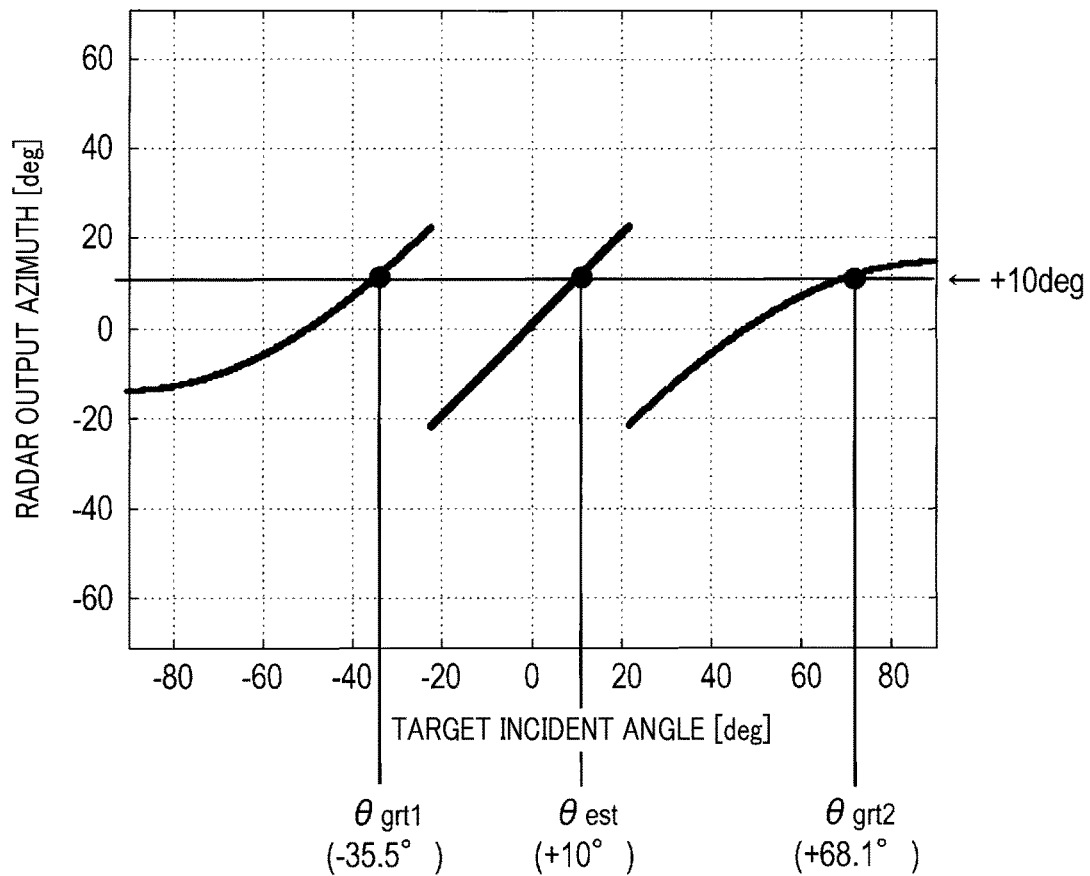
FIG. 11 is a graph of the relationship between a target incident angle (θreal) and a radar output azimuth (θest).

As shown in FIG. 10, in the case in which a real target of a stationary object is present at positions A, B, and C, the radar apparatus 2 outputs position A. In other words, it is unknown at which positions A, B, and C a real target is present from only the position outputted from the radar apparatus 2. In other words, the target incident angle (θreal), which is the incident angle of an actual stationary object, and the radar output azimuth (θest), which is the azimuth angle of the target by the radar apparatus 2, have a relationship as shown in FIG. 11. Hence, for example, in the case in which the radar output azimuth is displayed as 10 degrees (+10 deg), angles of +10 degrees (θest), −35.5 degrees (θgrt1), and +68.1 degrees (θgrt2) are the candidates of the real target. Thus, the true azimuth of the real target is unknown from the radar output azimuth. Therefore, the real target of a stationary object is distinguished from its ghost as below.

First, the Doppler relative velocity Vr of an observed stationary object is expressed by Expression (8) below. Then, the relationship of Expression (9) below is satisfied, $$Vr = -Vn \cos \theta real \quad (8)$$

(where, Vn is the radar-apparatus-installed vehicle velocity).

$$-Vr/\cos \theta real = Vn \quad (9)$$

Here, the detection area of the radar apparatus 2 is in a range of angles of ±22 degrees, for example, which are detection limit angles, and a target located outside the detection area is a grating target. Thus, theoretically, θreal is matched with any one of θest, θgrt1, and θgrt2 calculated in Steps S420 and 430.

Figure 12:
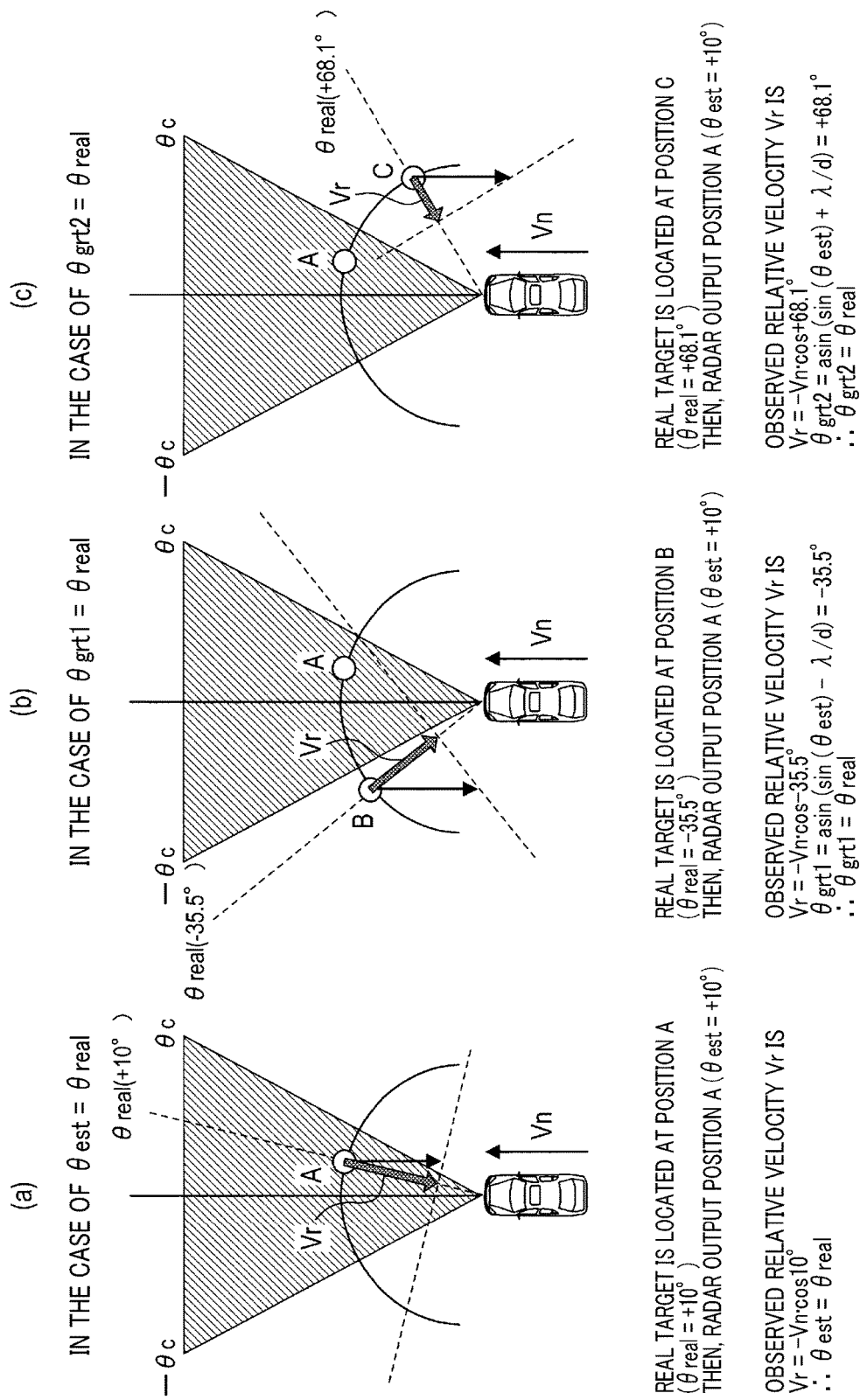
FIG. 12 shows explanatory diagrams of the principles of determination; (a) in the case of θest=θreal, (b) in the case of θgrt1=θreal, and (c) in the case of θgrt2=θreal.

In detail, as shown in (a) in FIG. 12, for example, in the case in which a real target is located at position A (θreal=+10 degrees), the radar apparatus 2 outputs position (azimuth angle) A (θest=+10 degrees).

In this case, the observed relative velocity Vr (the relative velocity Vr at the position at θreal) is "Vr=−Vn·cos 10". Then, θest=θreal is satisfied, and a determination can be made that the target outputted at position A is a real target.

As shown in (b) in FIG. 12, for example, in the case in which a real target is located at position B (θreal=−35.5 degrees), the radar apparatus 2 outputs position (azimuth angle) A (θest=+10 degrees).

In this case, the observed relative velocity Vr (the relative velocity Vr at the position at θreal) is "Vr=−Vn·cos−35.5°". From Expression (1) above, "θgrt1=asin(sin(θest)−

λ/d=−35.5°". Then, "θgrt1=θreal" is satisfied, and the target outputted at position A is a ghost whose actual position is at an angle of −35.5 degrees.

As shown in (c) in FIG. 12, for example, in the case in which a real target is located at position C (θreal=+68.1 degrees), the radar apparatus 2 outputs position (azimuth angle) A (θest=+10 degrees).

In this case, the observed relative velocity Vr (the relative velocity Vr at the position of θreal) is "Vr=−Vn·cos+68.1°". From Expression (2) above, "θgrt2=asin(sin(θest)+λ/d)=−68.1°". Then, "θgrt2=θreal" is satisfied, and the target outputted at position A is a ghost whose actual position is at an angle of +68.1 degrees.

Note that, in the case in which the radar-apparatus-installed vehicle is stopped, the relative velocity Vr is zero. Hence, it is unable to distinguish a real target from a ghost.

Thus, if "−Vr/cos θest=Vn" is satisfied as in the determination in Step S450, a determination can be made that the target is a real target.

On the other hand, if "−Vr/cosθgrt1=Vn" or "−Vr/cos θgrt2=Vn" is satisfied as in the determination in Step S470, a determination can be made that the target is a ghost.

In other words, distinguishing can be made that the actual incident angle of the target observed at an estimation angle θest is θgrt1 or θgrt2.

Thus, by the determination in Steps S450 and S470 described above, a determination can be made that the target is a real target of a stationary object or its ghost.

As described in detail above, in the second embodiment, whether the target is a real target of a stationary object or its ghost can be easily and highly accurately determined by the processes described above.

Figure 9B:
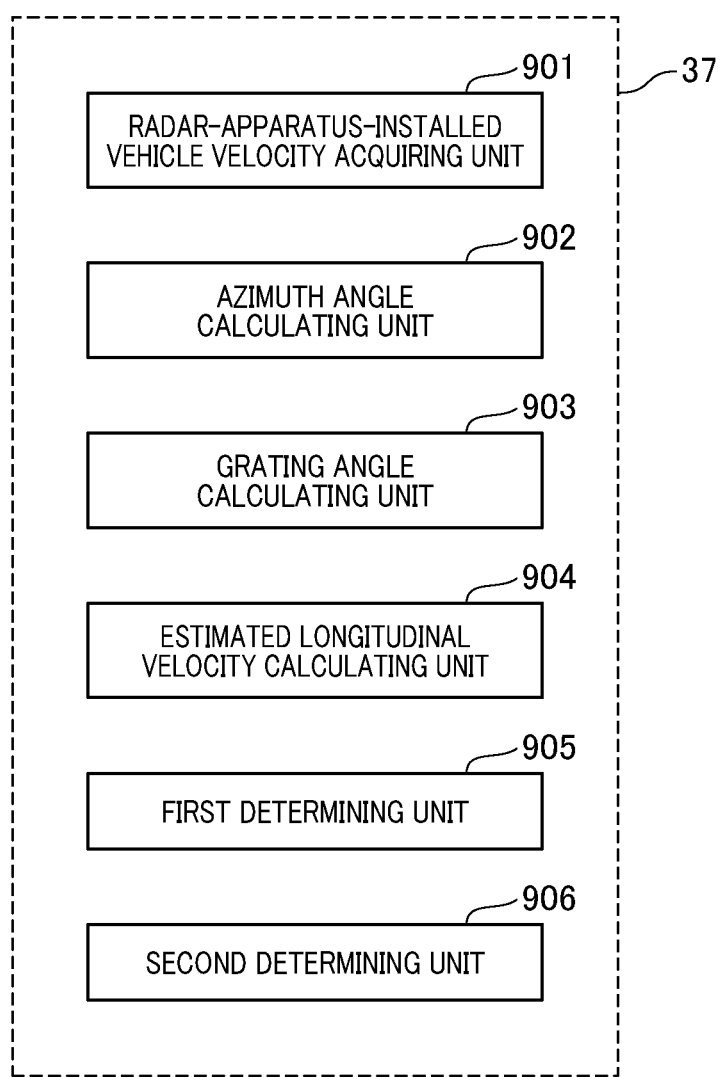
FIG. 9B is a functional block diagram of a signal processor of a radar apparatus according to the second embodiment.

FIG. 9B is a functional block showing the functions of the signal processor 37 according to the second embodiment, which are embodied by a processor, software, or these combinations of them. The signal processor 37 includes a radar-apparatus-installed vehicle velocity acquiring unit 901, an azimuth angle calculating unit 902, a grating angle calculating unit 903, an estimated longitudinal velocity calculating unit 904, a first determining unit 905, and a second determining unit 906. The radar-apparatus-installed vehicle velocity acquiring unit 901 performs the process in Step S410. The azimuth angle calculating unit 902 performs the process in Step S420. The grating angle calculating unit 903 performs the process in Step S430. The estimated longitudinal velocity calculating unit 904 performs the process in Step S440. The first determining unit 905 performs the processes in Steps S450 to S460. The second determining unit 906 performs the processes in Steps S470 to S480.

Note that, the present invention is not at all limited to the foregoing embodiments and the like. It goes without saying that the present invention can be embodied in various forms in the scope not deviating from the present invention.

(1) For example, in the foregoing embodiments, a function of a component, for example, may be distributed to a plurality of components, or functions of a plurality of components may be integrated into one component. At least a part of the configuration of an embodiment may be replaced by a known configuration having a similar function. Moreover, at least a part of the configuration of an embodiment may be added to or replaced by the configuration of another embodiment, for example.

(2) Note that, reference numerals and signs in parentheses described in clams are ones showing the corresponding relationship to specific means described as an aspect in the embodiments, which do not limit the technical scope of the present invention.

The invention claimed is:

1. A radar apparatus installed on a vehicle with a predetermined detection limit angle (±θc) to a front area of the vehicle, the radar apparatus transmitting radar waves externally from the vehicle, receiving reflected waves of the transmitted radar waves, and detecting information about a target which has reflected the radar waves, the radar apparatus characterized by:
   a relative velocity calculating unit that calculates a relative velocity (Vr) between the target and a radar-apparatus-installed vehicle based on information about the target which has reflected the radar waves;
   a radar-apparatus-installed vehicle velocity acquiring unit that acquires a velocity (Vn) of the radar-apparatus-installed vehicle; and
   a determining unit that compares a ratio (−Vr/Vn) of the relative velocity (Vr) to the velocity (Vn) of the radar-apparatus-installed vehicle with a determination value (α) that is a cosine (cos θc) of the detection limit angle (±θc) or the cosine (cos θc) plus a correction value including a measurement error, in which when a determination is made that the ratio (−Vr/Vn) exceeds the determination value (α), a determination is made that the target is a real target of a stationary object or a crossing object crossing a traveling route in the front area of the radar-apparatus-installed vehicle, and when a determination is made that the ratio (−Vr/Vn) is the determination value (α) or less, a determination is made that the target is a ghost of the stationary object or the crossing object.

2. The radar apparatus according to claim 1, wherein:
   determination by the determining unit is performed for a plurality of times; and
   when a determination is made that the target is the real target for a predetermined number of times, a confirmation is made that the target is the real target.

3. The radar apparatus according to claim 1, wherein:
   determination by the determining unit is performed for a plurality of times; and
   when a determination is made that the target is a ghost of the real target for a predetermined number of times, a confirmation is made that the target is a ghost of the real target.

4. A radar apparatus installed on a vehicle, the radar apparatus transmitting radar waves externally from the vehicle, receiving reflected waves of the transmitted radar waves, and detecting information about a target which has reflected the radar waves, the radar apparatus characterized by:
   a radar-apparatus-installed vehicle velocity acquiring unit that calculates a velocity (Vn) of the radar-apparatus-installed vehicle;
   an azimuth angle calculating unit that calculates an azimuth angle (θest) of a main target to be a basis based on information about the target which has reflected the radar waves;
   a grating angle calculating unit that calculates a left grating angle (θgrt1) and a right grating angle (θgrt2) to the main target;
   an estimated longitudinal velocity calculating unit that calculates a main estimated longitudinal velocity (Vy_est) of the main target, a first estimated longitudinal velocity (Vy_grt1) of a first target having the left grating angle (θgrt1), and a second estimated longitudinal velocity (Vy_grt2) of a second target having the right grating angle (θgrt2);

a first determining unit that compares the main estimated longitudinal velocity (Vy_est) of the main target with the velocity (Vn) of the radar-apparatus-installed vehicle, in which when the main estimated longitudinal velocity (Vy_est) of the main target and the velocity (Vn) of the radar-apparatus-installed vehicle are substantially equal, a determination is made that the main target is a real target; and a second determining unit that compares the first estimated longitudinal velocity (Vy_grt1) of the first target with the velocity (Vn) of the radar-apparatus installed vehicle, in which when the first estimated longitudinal velocity (Vy_grt1) of the first target and the velocity (Vn) of the radar-apparatus-installed vehicle are substantially equal, a determination is made that the target determined whose longitudinal velocity is equal to the radar-apparatus-installed vehicle velocity is a ghost of a stationary object, or that compares the second estimated longitudinal velocity (Vy_grt2) of the second target with the velocity (Vn) of the radar-apparatus-installed vehicle, in which when the second estimated longitudinal velocity (Vy_grt2) of the second target and the velocity (Vn) of the radar-apparatus-installed vehicle are substantially equal, a determination is made that the target determined whose longitudinal velocity is equal to the radar-apparatus-installed vehicle velocity is a ghost of a stationary object.

5. The radar apparatus according to claim 4, wherein the left grating angle (θgrt1) and the right grating angle (θgrt2) are calculated by Expressions (1) and (2)

$$\theta grt1 = a\sin(\sin(\theta est) - \lambda/d) \qquad (1)$$

$$\theta grt2 = a\sin(\sin(\theta est) + \lambda/d) \qquad (2)$$

where, $\lambda$ is a wavelength [m] and d is an antenna element gap [m].

6. The radar apparatus according to claim 4, wherein:

a relative velocity (Vr) between the target and the radar-apparatus-installed vehicle is found based on information about the target which has reflected the radar waves; and the main estimated longitudinal velocity (Vy_est), the first estimated longitudinal velocity (Vy_grt1), and the second estimated longitudinal velocity (Vy_grt2) are calculated by Expressions (3), (4), and (5) below $$Vy\_est = -Vr/\cos \theta est \qquad (3)$$

$$Vy\_grt1 = -Vr/\cos \theta grt1 \qquad (4)$$

$$Vy\_grt2 = -Vr/\cos \theta grt2 \qquad (5).$$

7. The radar apparatus according to claim 4, wherein:

determination by the first determining unit is performed for a plurality of times; and when a determination is made that the target is the real target for a predetermined number of times, a confirmation is made that the target is the real target.

8. The radar apparatus according to claim 4, wherein:

determination by the second determining unit is performed for a plurality of times; and when a determination is made that the target is a ghost of the real target for a predetermined number of times, a confirmation is made that the target is a ghost of the real target.

* * * * *